(12) United States Patent
Park et al.

(10) Patent No.: US 9,265,008 B2
(45) Date of Patent: Feb. 16, 2016

(54) METHOD FOR CONTROLLING UPLINK TRANSMISSION POWER IN WIRELESS COMMUNICATION SYSTEM AND APPARATUS THEREFOR

(71) Applicant: LG ELECTRONICS INC., Seoul (KR)

(72) Inventors: Jonghyun Park, Anyang-si (KR); Illsoo Sohn, Anyang-si (KR); Kijun Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/379,431

(22) PCT Filed: Feb. 25, 2013

(86) PCT No.: PCT/KR2013/001485
§ 371 (c)(1),
(2) Date: Aug. 18, 2014

(87) PCT Pub. No.: WO2013/129809
PCT Pub. Date: Sep. 6, 2013

(65) Prior Publication Data
US 2015/0018030 A1  Jan. 15, 2015

Related U.S. Application Data

(60) Provisional application No. 61/603,928, filed on Feb. 27, 2012, provisional application No. 61/605,173, filed on Feb. 29, 2012.

(51) Int. Cl.
| | |
|---|---|
| *H04W 52/00* | (2009.01) |
| *H04W 52/04* | (2009.01) |
| *H04W 52/28* | (2009.01) |
| *H04W 52/14* | (2009.01) |
| *H04W 52/32* | (2009.01) |
| *H04L 5/00* | (2006.01) |

(52) U.S. Cl.
CPC ............ *H04W 52/04* (2013.01); *H04W 52/283* (2013.01); *H04L 5/0048* (2013.01); *H04W 52/146* (2013.01); *H04W 52/325* (2013.01)

(58) Field of Classification Search
CPC .............................. H04W 52/04; H04L 5/0048
USPC .......... 455/522, 69, 456.1, 456.3, 452.2, 500, 455/524, 525; 370/345, 329
See application file for complete search history.

(56) References Cited

U.S. PATENT DOCUMENTS

2010/0246561 A1*  9/2010  Shin .................... H04W 52/32 370/345
2011/0275335 A1   11/2011  Luo et al.

(Continued)

*Primary Examiner* — John J Lee
(74) *Attorney, Agent, or Firm* — Birch, Stewart, Kolasch & Birch, LLP

(57) ABSTRACT

The present application relates to a method for enabling a terminal to transmit a sounding reference signal (SRS) in a wireless communication system. Specifically, the method comprises the steps of selecting at least one SRS power control process of a first SRS power control process and a second SRS power control process on the basis of a terminal location area; determining the transmission power of the SRS by using at least one SRS power control process; and transmitting at least one SRS to at least one base station of a first base station and a second base station participating in base cooperation communication, using the determined SRS transmission power. The terminal location area is characterized in that the base station from which downlinks are received and the base station to which uplinks are transmitted, comprise different base station cooperation areas.

10 Claims, 9 Drawing Sheets

(56) References Cited

U.S. PATENT DOCUMENTS

| | | |
|---|---|---|
| 2011/0280169 A1 | 11/2011 | Seo et al. |
| 2011/0292826 A1 | 12/2011 | Ahn et al. |
| 2014/0376482 A1* | 12/2014 | Kim ............ H04B 7/024 370/329 |
| 2015/0085787 A1* | 3/2015 | Ouchi ........... H04L 5/0037 370/329 |

* cited by examiner

FIG. 2
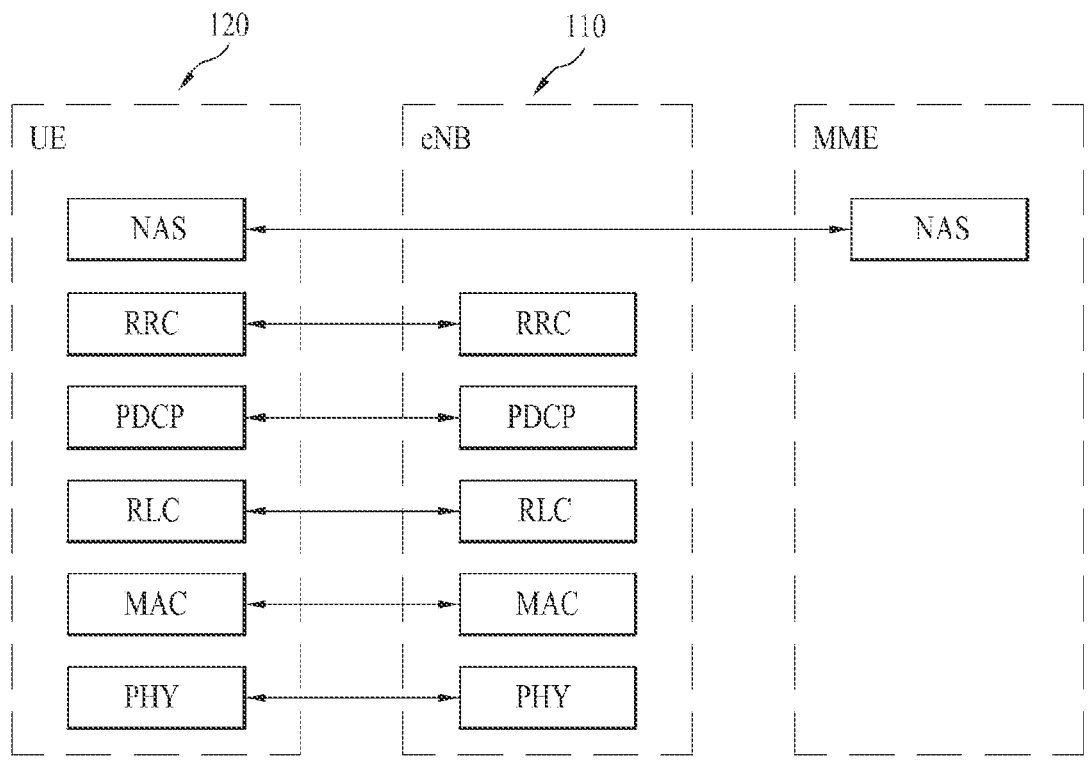
(a) CONTROL PLANE PROTOCOL STACK
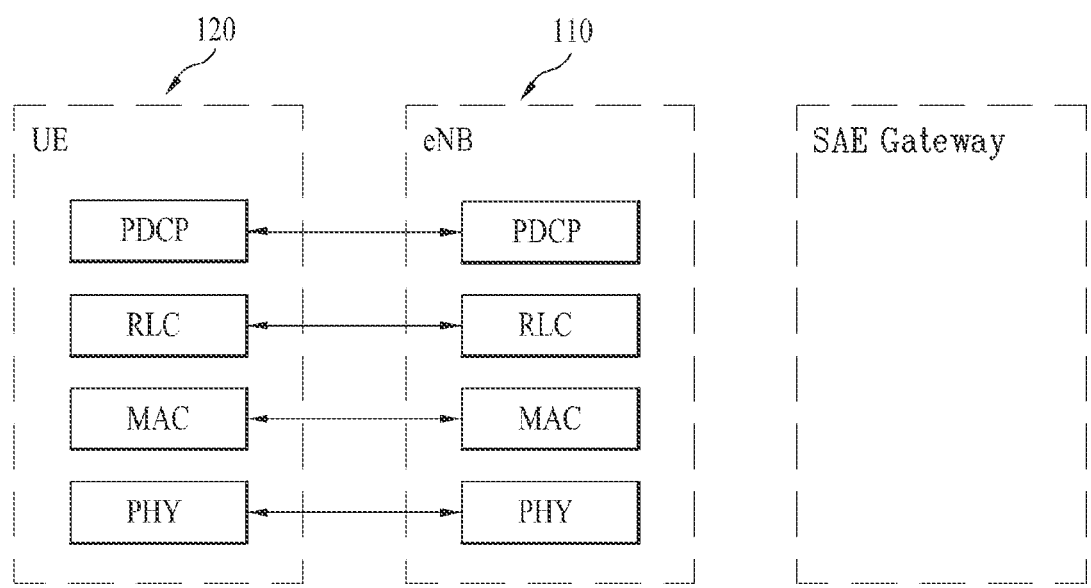
(b) USER PLANE PROTOCOL STACK

METHOD FOR CONTROLLING UPLINK TRANSMISSION POWER IN WIRELESS COMMUNICATION SYSTEM AND APPARATUS THEREFOR

CROSS REFERENCE TO RELATED APPLICATIONS

This application is the National Phase of PCT International Application No. PCT/KR2013/001485, filed on Feb. 25, 2013, which claims priority under 35 U.S.C. 119(e) to U.S. Provisional Application Nos. 61/603,928, filed on Feb. 27, 2012 and 61/605,173 filed on Feb. 29, 2012, all of which are hereby expressly incorporated by reference into the present application.

TECHNICAL FIELD

The present invention relates to a wireless communication system and, more particularly, to a method for controlling uplink transmission power in a wireless communication system and an apparatus therefor.

BACKGROUND ART

A 3rd generation partnership project long term evolution (3GPP LTE, hereinafter referred to as "LTE") communication system is briefly described as an example of a wireless communication system to which the present invention is applicable.

FIG. 1 is a diagram schematically illustrating an evolved universal mobile telecommunications system (E-UMTS) network structure as an example of a wireless communication system. E-UMTS is the next stage in the evolution of UMTS and is currently undergoing standardization in the 3GPP. In general, E-UMTS may be referred to as an LTE system. Release 7 and Release 8 of "3rd Generation Partnership Project; Technical Specification Group Radio Access Network" may be referred to for details of technical specifications of the UMTS and the E-UMTS.

Referring to FIG. 1, the E-UMTS includes a terminal (for example, user equipment (UE)), a base station (for example, an eNode B (eNB)), and an access gateway (AG) positioned at the end of a network (for example, an evolved UMTS terrestrial radio access network (E-UTRAN)) and connected to an external network. The base station may simultaneously transmit multiple data streams for a broadcast service, a multicast service, and/or a unicast service.

A base station includes one or more cells. A cell is set to one of bandwidths such as 1.44, 3, 5, 10, 15, and 20 MHz to provide a downstream or upstream transmission service to several terminals. Different cells may be set to provide different bandwidths. The base station controls data transmission and reception for a plurality of terminals. The base station transmits downlink scheduling information for downlink data to inform a terminal of information about a time/frequency domain in which the data is to be transmitted, decoding, data size, a hybrid automatic repeat and request (HARQ), etc. In addition, the base station transmits uplink scheduling information for uplink data to a terminal to inform the terminal of information about a time/frequency domain available to the terminal, decoding, data size, a HARQ, etc. An interface may be used between base stations to transmit user traffic or control traffic. A core network (CN) may include the AG, a network node for registering a terminal user, etc. The AG manages terminal mobility in a unit of a tracking area (TA) including a plurality of cells.

Even though the wireless communication system has been developed into LTE based on wideband code division multiple access (WCDMA), demands and expectations of users and service providers are continuously increasing. Moreover, since other radio access technologies are continuously being developed, new technological evolution is required to remain competitive in the future. There is a desire for reduction in price per bit, increase in service availability, flexible use of a frequency band, simple structure, open interface, appropriate power consumption of a terminal, etc.

DISCLOSURE

Technical Problem

An object of the present invention devised to solve the problem lies in a method of controlling uplink transmission power in a wireless communication system and an apparatus therefor.

Technical Solution

The object of the present invention can be achieved by providing a method for transmitting a sounding reference signal (SRS) in a base station cooperative communication system by a terminal, the method comprising selecting at least one SRS power control process of a first SRS power control process and a second SRS power control process based on a region in which the terminal is located, determining transmission power of the SRS using the at least one SRS power control process, and transmitting at least one SRS with the determined SRS transmission power to at least one of a first base station and a second base station participating in base station cooperative communication, wherein the region in which the terminal is located comprises a base station cooperative region including a downlink reception target base station and an uplink transmission target base station different from each other.

Here, the region in which the terminal is located may include a first region including the downlink reception target base station and the uplink transmission target base station as the first base station, and a second region including the downlink reception target base station and the uplink transmission target base station as the second base station.

Preferably, the at least one SRS power control process is the first SRS power control process when the terminal is located in the first region, and is the second SRS power control process when the terminal is located in the second region. However, the at least one SRS power control process includes both the first SRS power control process and the second SRS power control process when the terminal is located in the base station cooperative region.

More preferably, the at least one SRS includes an SRS for downlink channel state information and an SRS for uplink channel state information when the terminal is located in the base station cooperative region.

Further, when the terminal is located in the base station cooperative region, a path loss estimate $PL_c$ of the first SRS power control process is determined based on a reference signal received from the first base station, and a path loss estimate $PL_c$ of the second SRS power control process is determined based on a reference signal received from the second base station.

In addition, a parameter of a corresponding SRS power control process is maintained when the terminal moves from the base station cooperative region to the first region or the second region.

Preferably, an uplink data channel of the terminal may be transmitted with transmission power obtained by reflecting an offset value in the determined SRS transmission power. Alternatively, a power control process for an uplink data channel of the terminal may be determined based on one of the first SRS power control process and the second SRS power control process, indicated by an uplink scheduling grant.

In addition, an uplink control channel of the terminal is transmitted with transmission power obtained by reflecting an offset value in the determined SRS transmission power.

In another aspect of the present invention, provided herein is a terminal device in a base station cooperative communication system comprising a processor for selecting at least one SRS power control process of a first SRS power control process and a second SRS power control process based on a region in which the terminal device is located, and determining transmission power of an SRS using the at least one SRS power control process, and a wireless communication module for transmitting the at least one SRS with the determined SRS transmission power to at least one of a first base station and a second base station participating in base station cooperative communication, wherein the region in which the terminal is located device comprises a base station cooperative region including a downlink reception target base station and an uplink transmission target base station different from each other.

Advantageous Effects

According to embodiments of the invention, a terminal may efficiently control uplink transmission power, in particular, transmission power of a sounding reference signal (SRS) in a wireless communication system.

It will be appreciated by persons skilled in the art that that the technical objects that can be achieved through the present invention are not limited to what has been particularly described hereinabove and other technical objects of the present invention will be more clearly understood from the following detailed description.

DESCRIPTION OF DRAWINGS

FIG. 2 is a diagram illustrating configurations of a control plane and a user plane of a radio interface protocol between a terminal and an evolved UMTS terrestrial radio access network (E-UTRAN) based on a 3rd generation partnership project long term evolution (3GPP) radio network standard.

BEST MODE

Figure 1:
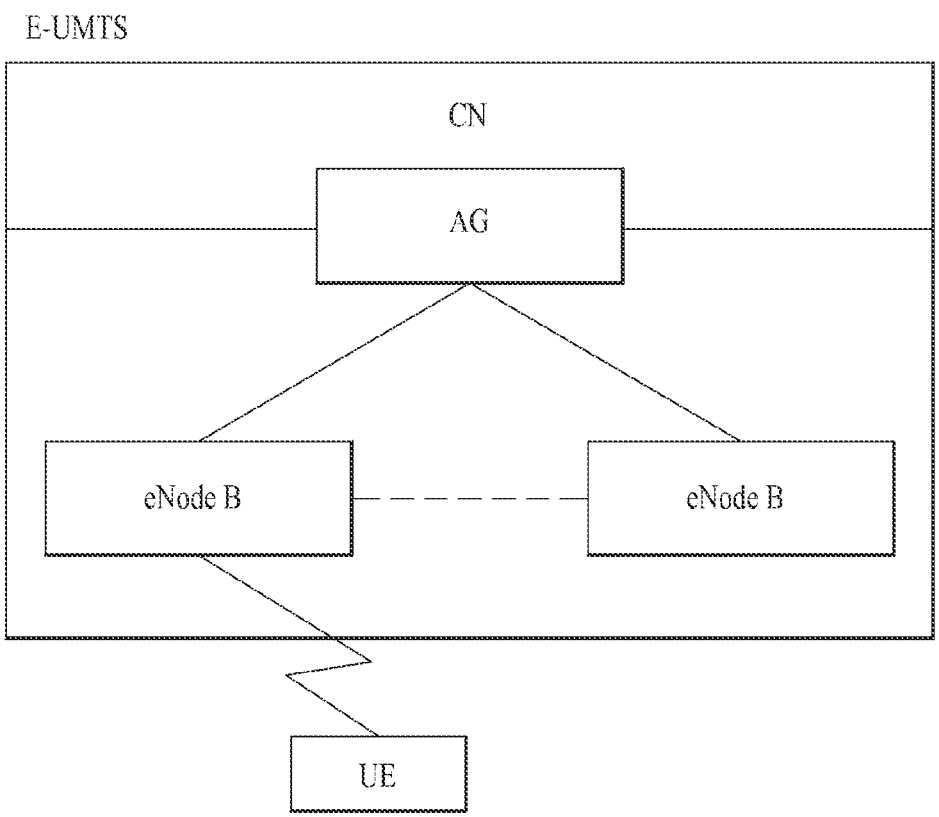
FIG. 1 is a diagram schematically illustrating an evolved universal mobile telecommunications system (E-UMTS) network structure as an example of a wireless communication system.

Hereinafter, a structure, effects, and characteristics of the present invention will be easily understood by embodiments of the present invention described with reference to the accompanying drawings. The embodiments described below are examples in which technical characteristics of the present invention are applied to a 3rd generation partnership project long term evolution (3GPP) system.

This specification describes the embodiments of the present invention using a long term evolution (LTE) system, and an LTE-advanced (LTE-A) system. However, the embodiments are merely examples, and the embodiments of the present invention may be applied to any communication system corresponding thereto. In addition, in this specification, the term "base station" is used as a comprehensive term including a remote radio head (RIM), a transmission point (TP), a reception point (RP), an eNB, a relay, etc.

FIG. 2 is a diagram illustrating configurations of a control plane and a user plane of a radio interface protocol between a terminal and an evolved universal mobile telecommunications system (UMTS) terrestrial radio access network (E-UTRAN) based on 3GPP radio network standard. The control plane refers to a path for transmitting a control message used for user equipment (UE) and a network to manage a call. The user plane refers to a path for transmitting data generated in an application layer, for example, audio data or Internet packet data.

A physical layer corresponding to a first layer provides an information transfer service to a higher layer using a physical channel. The physical layer is connected to a medium access control (MAC) layer positioned on the upper side thereof through a transmission channel (a transmission antenna port channel). Data moves between the MAC layer and the physical layer through the transmission channel. Data moves between physical layers of a transmitter and a receiver through a physical channel. The physical channel uses time and frequency as radio resources. Specifically, the physical channel is modulated by an orthogonal frequency division multiple access (OFDMA) scheme in downlink, and is modulated by a single carrier frequency division multiple access (SC-FDMA) scheme in uplink.

The MAC layer of a second layer provides a service to a radio link control (RLC) layer corresponding to a higher layer through a logical channel. The RLC layer of the second layer supports reliable data transmission. A function of the RLC layer may be implemented by a functional block within the MAC layer. A packet data convergence protocol (PDCP) layer of the second layer performs a header compression function for reducing unnecessary control information to efficiently transmit an Internet protocol (IP) packet such as Internet protocol version 4 (IPv4) and Internet protocol version 6 (IPv6) in a radio interface having a small bandwidth.

A radio resource control (RRC) layer positioned in a lowermost portion of a third layer is defined only in the control plane. The RRC layer controls a logical channel, a transmission channel, and a physical channel relevant to configuration, reconfiguration, and release of a radio bearer (RB). The RB refers to a service provided by the second layer for data transfer between a terminal and a network. To achieve this, RRC messages are exchanged between the terminal and the RRC layer of the network. When the terminal and the RRC layer of the network are connected (RRC connected), the terminal is in an RRC connected mode. Otherwise, the terminal is in an RRC idle mode. A non-access stratum (NAS) layer positioned on the upper side of the RRC layer performs a function such as session management, mobility management, etc.

A cell included in a base station (for example, an eNB) is set to one of bandwidths such as 1.44, 3, 5, 10, 15, and 20 MHz to provide a downstream or upstream transmission service to several terminals. Different cells may be set to provide different bandwidths.

Examples of a downstream transmission channel for transmitting data from a network to a terminal include a broadcast channel (BCH) for transmitting system information, a paging channel (PCH) for transmitting a paging message, a downstream shared channel (SCH) for transmitting user traffic or control messages, etc. Traffic or control messages of a downstream multicast or broadcast service may be transmitted through the downstream SCH, or may be transmitted through a separate downstream multicast channel (MCH). On the other hand, examples of an upstream transmission channel for transmitting data from a terminal to a network include a random access channel (RACH) for transmitting an initial control message, and an upstream SCH for transmitting user traffic or a control message. Examples of a logical channel positioned on the upper side of a transmission channel and mapped to the transmission channel include a broadcast control channel (BCCH), a paging control channel (PCCH), a common control channel (CCCH), a multicast control channel (MCCH), a multicast traffic channel (MTCH), etc.

Figure 3:
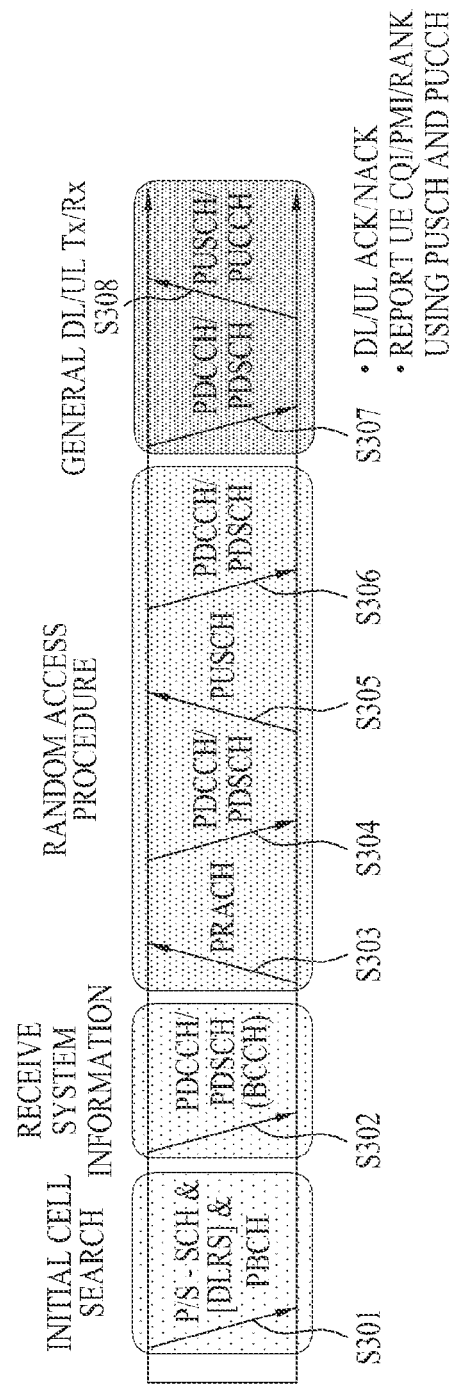
FIG. 3 is a diagram illustrating physical channels used for a 3GPP system and a general signal transmission scheme using the physical channels.

FIG. 3 is a diagram illustrating physical channels used for a 3GPP system and a general signal transmission scheme using the physical channels.

In S301, a terminal performs an initial cell search procedure, for example, a procedure of synchronizing with a base station when the terminal is turned on or newly enters a cell. To achieve this, the terminal receives a primary synchronization channel (P-SCH) and a secondary synchronization channel (S-SCH) from the base station to be synchronized with the base station, and may acquire information such as a cell identifier (ID). Thereafter, the terminal may acquire inner-cell broadcast information by receiving a physical broadcast channel from the base station. Meanwhile, the terminal may verify a downlink channel state by receiving a downlink reference signal (DL RS) in an initial cell search step.

In S302, the terminal finishing the initial cell search procedure may acquire more specific system information by receiving a physical downlink control channel (PDCCH), and a physical downlink shared channel (PDSCH) according to information included in the PDCCH.

When the terminal initially accesses the base station, or a radio resource for signal transmission is absent, the terminal may perform a random access procedure with respect to the base station in S303 through S306. To achieve this, the terminal may transmit a particular sequence as a preamble through a physical random access channel (PRACH) in S303 and S305, and may receive a response message for the preamble through the PDCCH and the corresponding PDSCH in S304 and S306. A contention resolution procedure may be additionally performed for a contention based RACH.

Thereafter, the terminal performing the above-described procedures may receive the PDCCH/PDSCH in S307, and transmit a physical uplink shared channel (PUSCH)/physical uplink control channel (PUCCH) in S308 as a general up/downlink signal transmission procedure. In particular, the terminal receives downlink control information (DCI) through the PDCCH. Here, the DCI includes control information such as resource allocation information for a terminal, and has different formats depending on the purpose of use.

Meanwhile, control information transmitted by the terminal to the base station through an uplink, or received by the terminal from the base station includes a downlink/uplink acknowledgement (ACK)/negative acknowledgement (NACK) signal, a channel quality indicator (CQI), a precoding matrix index (PMI), a rank indicator (RI), etc. In the 3GPP LTE system, the terminal may transmit the above-described control information such as the CQI, the PMI, the RI, etc. through the PUSCH and/or the PUCCH.

Figure 4:
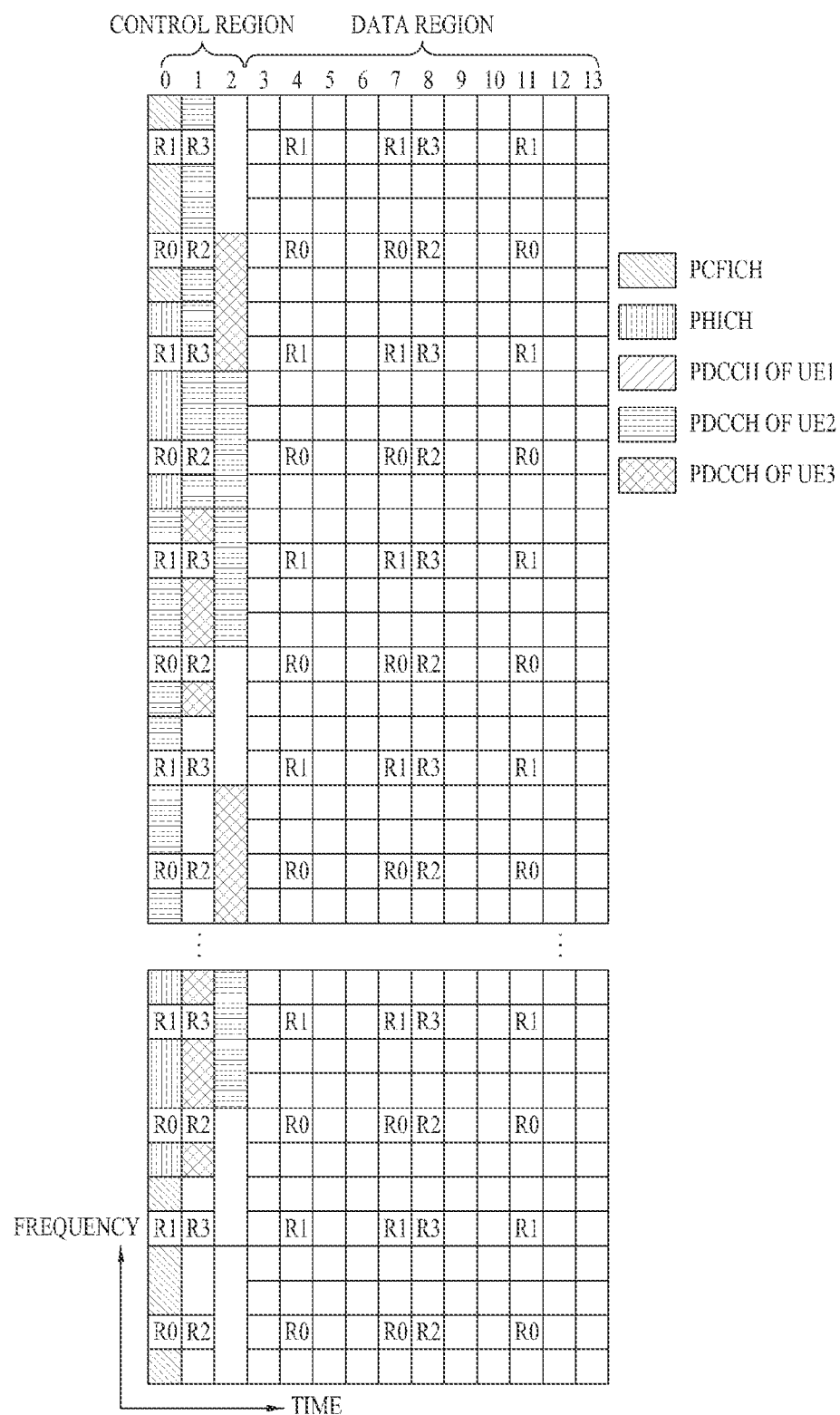
FIG. 4 is a diagram illustrating a structure of a downlink radio frame used in a long term evolution (LTE) system.

FIG. 4 is a diagram illustrating a control channel included in a control region of a subframe in a downlink radio frame.

Referring to FIG. 4, the subframe includes 14 orthogonal frequency division multiplexing (OFDM) symbols. One to three initial OFDM symbols are used as a control region, and remaining 11 to 13 OFDM symbols are used as a data region according to subframe setting. R1 to R4 of FIG. 4 denote reference signals (RSs) or pilot signals) for antennas 0 to 3, respectively. RSs are fixed in a constant pattern within a subframe irrespective of the control region and the data region. The control channel is allocated to a resource excluding an RS in the control region, and a traffic channel is allocated to a resource excluding an RS in the data region. Examples of the control channel allocated to the control region include a physical control format indicator channel (PCFICH), a physical hybrid-ARQ indicator channel (PHICH), a physical downlink control channel (PDCCH), etc.

The PCFICH is a physical control format indicator channel, and informs the terminal of the number of OFDM symbols used for the PDCCH for each subframe. The PCFICH is positioned in a first OFDM symbol, and is set prior to the PHICH and the PDCCH. The PCFICH includes four resource element groups (REGs), and the respective REGs are dispersed within the control region based on a cell ID. An REG includes four resource elements (REs). An RE indicates a minimum physical resource defined as a subcarrier multiplied by an OFDM symbol. Values of the PCFICH indicate values of 1 to 3, or 2 to 4 depending on bandwidth, and are modulated by quadrature phase shift keying (QPSK).

The PHICH is a hybrid-automatic repeat and request (HARQ) indicator channel, and is used to carry an HARQ ACK/NACK for uplink transmission. That is, the PHICH indicates a channel for transmitting downlink ACK/NACK information for uplink HARQ. The PHICH includes an REG and is cell-specifically scrambled. The ACK/NACK is indicated by a bit and is modulated by binary phase shift keying (BPSK). The modulated ACK/NACK is spread by a spreading factor (SF) of 2 or 4. A plurality of PHICHs mapped to the same resource constitute a PHICH group. The number of multiplexed PHICHs in the PHICH group is determined based on the number of spreading codes. The PHICH (group) is repeated three times to obtain a diversity gain in the frequency domain and/or the time domain.

The PDCCH is a physical downlink control channel, and is allocated to n initial OFDM symbols of a subframe. Here, n denotes an integer greater than or equal to 1, and is indicated by the PDFICH. The PDCCH includes one or more control channel elements (CCEs). The PDCCH informs each terminal or a terminal group of information about resource allocation of a downlink-shared channel (DL-SCH) and a PCH corresponding to a transmission channel, an uplink scheduling grant, HARQ information, etc. The PCH and the DL-SCH are transmitted through the PDSCH. Therefore, in general, each of a base station and a terminal transmits and receives data through the PDSCH except for particular control information or particular service data.

Information about a terminal (one or a plurality of terminals) to which data of the PDSCH is transmitted, information about a scheme for the terminal to receive and decode the PDSCH data, etc. are included in the PDCCH and transmitted. For example, it is presumed that a particular PDCCH is cyclic redundancy check (CRC)-masked by a radio network temporary identifier (RNTI) referred to as "A" and information about data transmitted using a radio resource (for example, a frequency location) referred to as "B" and transmission form information (for example, a transmission block size, modulation scheme, coding information, etc.) referred to as "C" is transmitted in a particular subframe. In this case, a terminal within a cell monitors the PDCCH using RNTI information included in the terminal. When one or more terminals include the RNTI "A", the terminals receive the PDCCH, and receive the PDSCH indicated by "B" and "C" using information about the received PDCCH.

Figure 5:
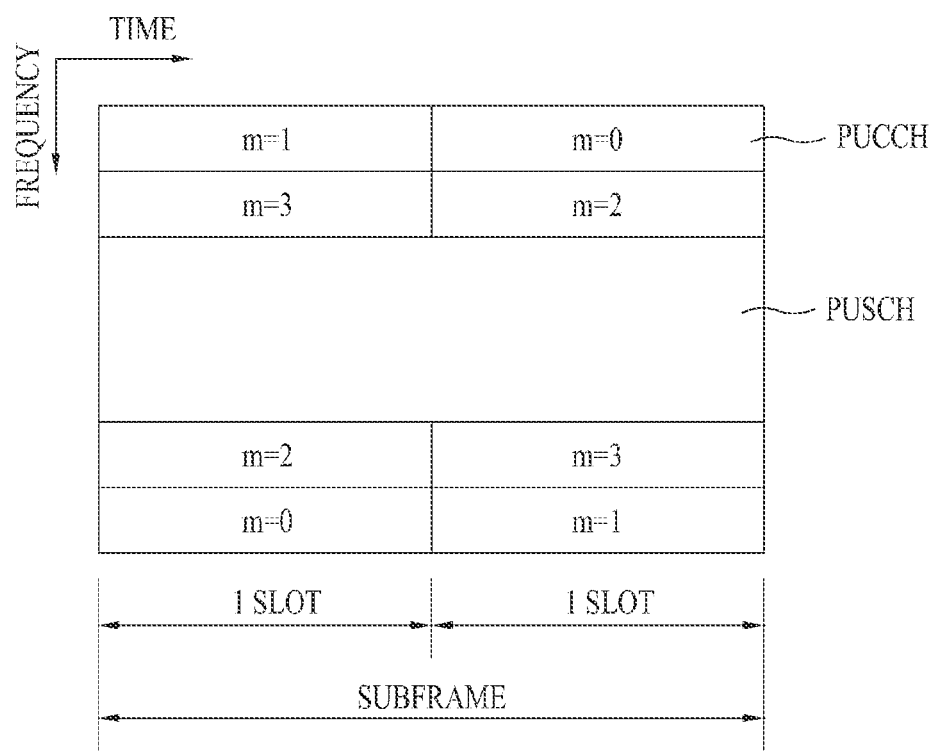
FIG. 5 is a diagram illustrating a structure of an uplink subframe used in an LTE system.

FIG. 5 is a diagram illustrating a structure of an uplink subframe used in an LTE system.

Referring to FIG. 5, the uplink subframe may be divided into a region to which a PUCCH carrying control information is allocated, and a region to which a PUSCH carrying user data is allocated. A center portion of the subframe is allocated to the PUSCH, and both sides of a data region in the frequency domain are allocated to the PUCCH. The control information transmitted on the PUCCH includes ACK/NACK used for HARQ, a CQI indicating a downlink channel state, an RI for multiple-input multiple-output (MIMO), a scheduling request (SR) corresponding to a request for uplink resource allocation, etc. A PUCCH for a terminal uses a resource block occupying different frequencies in respective slots within the subframe. That is, two resource blocks allocated to a PUCCH are frequency-hopped at a slot boundary. In particular, FIG. 5 illustrates that a PUCCH corresponding to m=0, a PUCCH corresponding to m=1, a PUCCH corresponding to m=2, and a PUCCH corresponding to m=3 are allocated to the subframe.

In addition, a sounding reference signal (SRS) within a subframe may be transmitted in a time period including a symbol positioned in a last portion on a time axis in the subframe, and is transmitted in a data transmission band on a frequency. SRSs of several terminals transmitted to the last symbol in the same subframe may be distinguished according to frequency locations.

Figure 6:
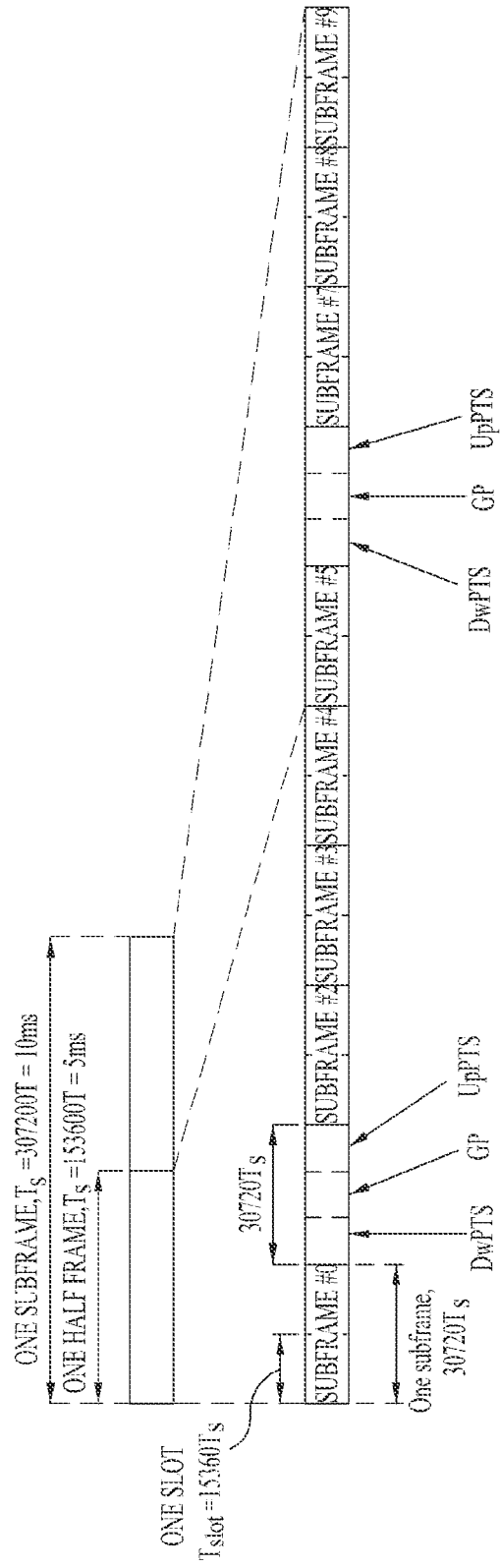
FIG. 6 is a diagram illustrating a structure of a radio frame in an LTE-time division duplex (TDD) system.

FIG. 6 is a diagram illustrating a structure of a radio frame in an LTE-time division duplex (TDD) system. In the LTE TDD system, the radio frame includes two half frames, and each half frame includes four general subframes having two slots, and a special subframe having a downlink pilot time slot (DwPTS), a guard period (GP), and an uplink pilot time slot (UpPTS).

In the special subframe, the DwPTS is used for initial cell search, synchronization, or channel estimation in a terminal. The UpPTS is used for channel estimation, and synchronization of uplink transmission of a terminal in a base station. That is, the DwPTS is used for downlink transmission, and the UpPTS is used for uplink transmission. In particular, the UpPTS is used for transmission of a PRACH preamble or an SRS. In addition, the GP is a period for cancelling interference occurring in uplink due to multipath delay of a downlink signal between uplink and downlink.

Meanwhile, in the LTE TDD system, uplink/downlink subframe setting (uplink-downlink configuration) is shown in Table 1.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, "D" denotes a downlink subframe, "U" denotes an uplink subframe, and "S" denotes the special subframe. In addition, Table 1 shows a downlink-to-uplink switch-point periodicity in the uplink/downlink subframe setting in each system.

The LTE-A system corresponding to a standard of a next generation mobile communication system is expected to support a Coordinated Multi-Point (CoMP) transmission scheme which is not supported by existing standards to enhance data transfer rate. Here, the CoMP transmission scheme refers to a transmission scheme enabling two or more base stations or cells to cooperatively communicate with a terminal to enhance communication performance between a terminal and a base station (a cell or a sector) in a shadow area.

The CoMP transmission scheme may be divided into a CoMP-joint processing (CoMP-JP) scheme having a cooperative MIMO form using data sharing, and a CoMP-Coordinated Scheduling/beamforming (CoMP-CS/CB) scheme.

In downlink, a terminal may instantaneously and simultaneously receive data from respective base stations performing the CoMP transmission scheme, and may combine signals received from the respective base stations to enhance reception performance in the CoMP-JP scheme (Joint Transmission). In addition, one of the base stations performing the CoMP transmission scheme may transmit data to the terminal at a specific point in time (Dynamic Point Selection). On the other hand, in the CoMP-CS/CB scheme, a terminal may instantaneously receive data using beam forming through a base station, that is, a serving base station.

In uplink, each base station may simultaneously receive a PUSCH signal from a terminal in the CoMP-JP scheme (Joint Reception). On the other hand, only one base station receives a PUSCH signal in the COMP-CS/CB scheme. In this instance, cooperative cells (or base stations) determine whether to use the CoMP-CS/CB scheme.

Hereinafter, a carrier aggregation scheme is described.

Figure 7:
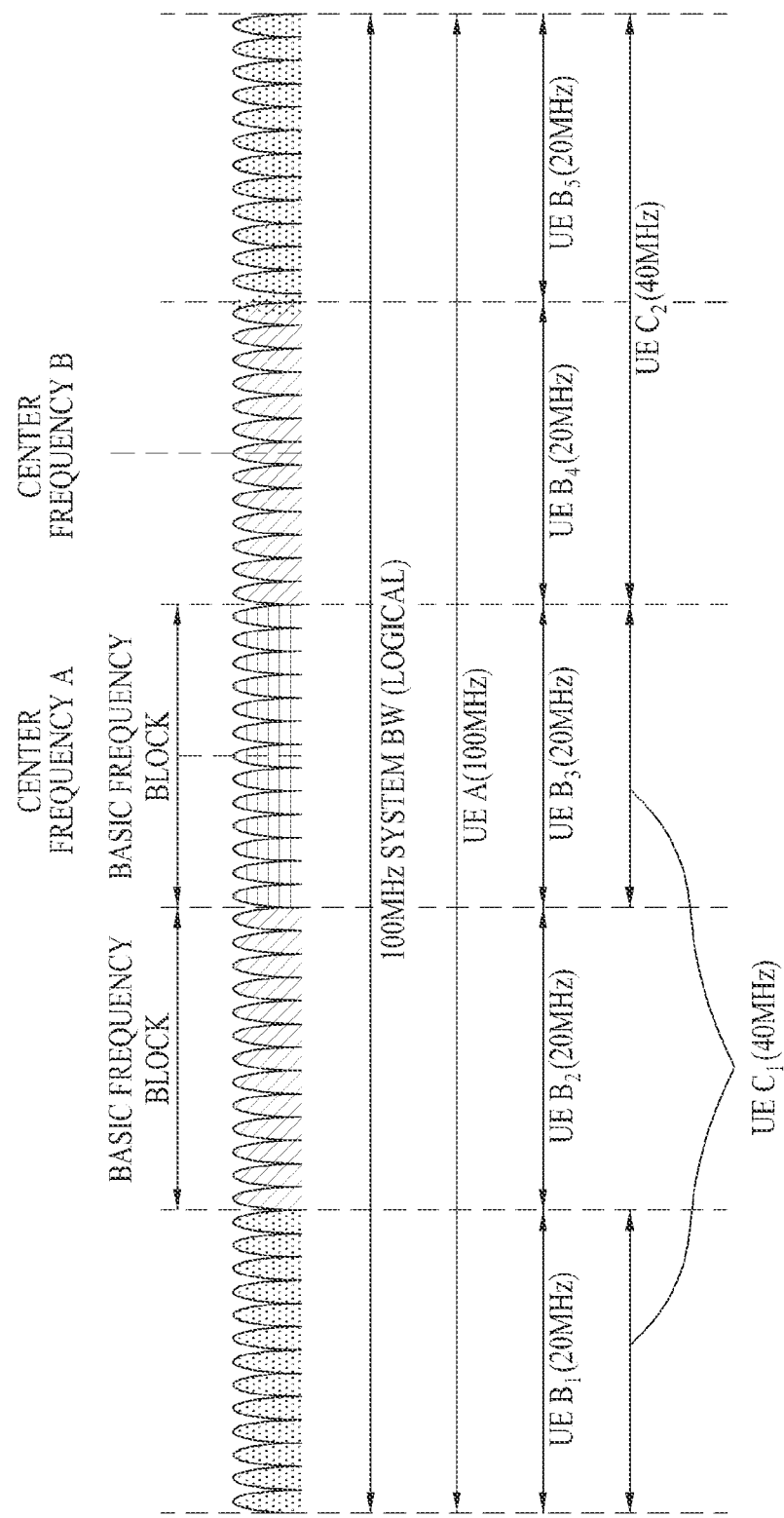
FIG. 7 is a conceptual diagram illustrating a carrier aggregation scheme.

FIG. 7 is a conceptual diagram illustrating carrier aggregation.

Carrier aggregation refers to a scheme in which a terminal uses a plurality of frequency blocks or (logical) cells including an uplink resource (or a component carrier) and/or a downlink resource (or a component carrier) as a large logical frequency bandwidth to enable a wireless communication system to use a wider frequency band. Hereinafter, the term "component carrier" is used for convenience of description.

Referring to FIG. 7, the entire system bandwidth has a maximum bandwidth of 100 MHz as a logical bandwidth. The entire system bandwidth includes five component carriers, and each of the component carriers has a maximum bandwidth of 20 MHz. A component carrier includes one or more physically contiguous subcarriers. FIG. 7 illustrates that the respective component carriers have the same bandwidth. However, the respective component carriers may have different bandwidths. In addition, the respective component carriers are depicted as being adjacent to each other in the frequency domain. However, FIG. 7 illustrates a logical concept, and the respective component carriers may be physically adjacent to each other, or may be separated from each other.

Different center frequencies may be used for the respective component carriers, and a common center frequency may be used for component carriers physically adjacent to each other. For example, referring to FIG. 8, a center frequency A may be used on the assumption that all component carriers are physically adjacent to each other. In addition, the center frequency A, a center frequency B, etc. may be separately used for respective component carriers on the assumption that the respective component carriers are not physically adjacent to each other.

In this specification, a component carrier may correspond to a system bandwidth of a legacy system. When a component carrier is defined based on a legacy system, backward compatibility is easily provided and system design is easily performed in a wireless communication environment including both an evolved terminal and a legacy terminal. For example, when the LTE-A system supports carrier aggregation, each component carrier may correspond to a system bandwidth of the LTE system. In this case, a component carrier may have one of bandwidths including 1.25, 2.5, 5, 10 and 20 MHz.

When the entire system bandwidth is extended through carrier aggregation, a frequency bandwidth used to communicate with each terminal is defined in a unit of component carrier. A terminal A may use 100 MHz corresponding to the entire system band and perform communication using all of five component carriers. Terminals $B_1$ to $B_5$ may use only a bandwidth of 20 MHz, and perform communication using one component carrier. Terminals $C_1$ and $C_2$ may use a bandwidth of 40 MHz, and perform communication using two component carriers. The two component carriers may or may not be logically/physically adjacent to each other. The terminal $C_1$ represents a case in which two non-adjacent component carriers are used, the terminal $C_2$ represents a case in which two adjacent component carriers are used.

While the LTE system uses a downlink component carrier and an uplink component carrier, the LTE-A system may use several component carriers as shown in FIG. 6. In this instance, a scheme for a control channel to schedule a data channel may be divided into an existing linked carrier scheduling scheme and a cross carrier scheduling scheme.

More specifically, in the linked carrier scheduling scheme, a control channel transmitted through a particular component carrier only schedules a data channel through the particular component carrier as in the existing LTE system using a single component carrier.

On the other hand, in the cross carrier scheduling scheme, a control channel transmitted through a primary component carrier using a carrier indicator field (CIF) schedules a data channel transmitted through the primary component carrier or transmitted through another component carrier.

Hereinafter, a method of controlling uplink transmission power in the LTE system is described.

A method of controlling, by a terminal, uplink transmission power of the terminal includes open loop power control (OLPC) and closed-loop power control (CLPC). OLPC serves to control power by estimating and compensating for downlink signal attenuation from a base station of a cell including a terminal, and controls uplink power by increasing uplink transmission power when a distance between the terminal and the base station increases and thus signal attenuation of a downlink increases. CLPC controls uplink power by directly transmitting information (that is, a control signal) used to adjust uplink transmission power in a base station.

Equation 1 below is an equation for determining transmission power of a terminal when a serving cell c only transmits a PUSCH rather than simultaneously transmitting both a PUSCH and a PUCCH in a subframe index i in a system supporting carrier aggregation.

$$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} [dBm] \quad \text{[Equation 1]}$$

Equation 2 below is an equation for determining PUSCH transmission power when the subframe index i of the serving cell c simultaneously transmits a PUCCH and a PUSCH in a system supporting carrier aggregation.

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} [dBm] \quad \text{[Equation 2]}$$

Hereinafter, parameters described with reference to Equation 1 and Equation 2 determine uplink transmission power of a terminal in the serving cell c. Here, $P_{CMAX,c}(i)$ of Equation 1 represents maximum power available for transmission of a terminal in the subframe index i, and $\hat{P}_{CMAX,c}(i)$ of Equation 2 represents a linear value $P_{CMAX,c}(i)$. $\hat{P}_{PUCCH}(i)$ of Equation 2 represents a linear value $P_{PUCCH}(i)$. Here, $P_{PUCCH}(i)$ represents PUCCH transmission power in the subframe index i.

In Equation 1, $M_{PUSCH,c}(i)$ represents a parameter indicating a bandwidth of PUSCH resource allocation expressed by the number of valid resource blocks for the subframe index i, and is a value allocated by a base station. $P_{O\_PUSCH,c}(j)$ is a parameter generated by adding a cell-specific nominal component $P_{O\_NOMINAL\_PUSCH,c}(j)$ provided from a higher layer to a terminal-specific component $P_{O\_PUSCH,c}(j)$ provided from a higher layer, and is a value that a base station reports to a terminal.

j is 1 for PUSCH transmission/retransmission according to an uplink grant, and j is 2 for PUSCH transmission/retransmission according to a random access response. In addition, equations $P_{O\_UE\_PUSCH,c}(2)=0$ and $P_{O\_NOMINAL\_PUSCH,c}(2)=P_{O\_PREAMBLE\_Msg3}$ are satisfied, and parameters $P_{O\_PRE}$ and $\Delta_{PREAMBLE\_Msg3}$ are signaled in a higher layer.

$\alpha_c(j)$ is a path loss compensation factor, and is a cell-specific parameter provided by a higher layer and transmitted by a base station as 3 bits. $\alpha$ corresponds to one of 0, 0.4, 0.5, 0.6, 0.7, 0.8, 0.9, and 1 when j is 0 or 1, and $\alpha_c(j)$ is 1 when j is 2. $\alpha_c(j)$ is a value that a base station reports to a terminal.

A path loss $PL_c$ is an estimate of a downlink path loss (or a signal loss) calculated in a unit of dB by a terminal, and is expressed by $PL_c$=referenceSignalPower−higher layer filtered RSRP. Here, a base station may inform a terminal of referenceSignalPower through a higher layer.

$f_c(i)$ is a value indicating a current PUSCH power control adjustment state for the subframe index i, and may be expressed as a current absolute value or an accumulated value. When accumulation is enabled based on a parameter provided from a higher layer, or when a transmit power control (TPC) command $\epsilon_{PUSCH,c}$ is included in a PDCCH together with DCI format 0 for a serving cell c scrambled by a temporary C-RNTI, an equation $f_c(i)=f_c(i-1)+\delta_{PUSCH,c}(i-K_{PUSCH})$ is satisfied. $\delta_{PUSCH,c}(i-K_{PUSCH})$ is signaled to a PDCCH together with DCI format 0/4 or 3/3A in a subframe i−$K_{PUSCH}$. Here, $f_c(0)$ is an initial value after an accumulated value is reset.

A value $K_{PUSCH}$ is defined as below in an LTE standard.

A value $K_{PUSCH}$ is 4 for frequency division duplex (FDD). For TDD, a value $K_{PUSCH}$ is as shown in Table 2.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

Except for a case of a DRX state, a terminal attempts to decode a PDCCH of DCI format 0/4 using a C-RNTI of the terminal or DCI format for an SPS C-RNTI and a PDCCH of DCI format 3/3A using a TPC-PUSCH-RNTI of the terminal in each subframe. When DCI format 0/4 and DCI format 3/3A for a serving cell c are detected in the same subframe, a terminal uses $\delta_{PUSCH,c}$ provided in DCI format 0/4. $\delta_{PUSCH,c}$ is 0 dB for a subframe in which a TPC command decoded for the serving cell c is absent, a DRX is generated, or a subframe having an index i is not an uplink subframe in TDD.

A $\delta_{PUSCH,c}$ accumulated value signaled on the PDCCH together with DCI format 0/4 is as shown in Table 3 below.

$\delta_{PUSCH,c}$ is 0 dB when the PDCCH together with DCI format 0 is validated by SPS activation, or the PDCCH is released. A $\delta_{PUSCH,c}$ accumulated value signaled on the PDCCH together with DCI format 3/3A corresponds to a SET1 of Table 3 below, or a SET2 of Table 4 determined by a TPC-index parameter provided in a higher layer.

TABLE 3

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH,c}$ [dB] |
|---|---|
| 0 | −1 |
| 1 | 1 |

When a terminal reaches a maximum transmission power $\hat{P}_{CMAX}(i)$ in the serving cell c, a positive TPC command is not accumulated for the serving cell c. On the other hand, when a terminal reaches a minimum maximum power, a negative TPC command is not accumulated.

Equation 3 below is an equation related to control of uplink power for a PUCCH in the LTE system.

$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix}[dBm] \quad \text{[Equation 3]}$$

In Equation 3, i denotes a subframe index, and c denotes a cell index. When a terminal is set by a higher layer to transmit a PUCCH on two antenna ports, a value $\Delta_{TxD}(F')$ is provided to the terminal by the higher layer, and 0 is provided otherwise. A parameter described below is a parameter for a serving cell having a cell index c.

Here, $P_{CMAX,c}(i)$ indicates maximum power that may be transmitted by a terminal, $P_{0\_PUCCH}$ is a parameter including a sum of cell-specific parameters, and is reported by a base station through higher layer signaling, and $PL_c$ is an estimate of downlink path loss (or signal loss) calculated by a terminal in dB, and is expressed by $PL_c$=referenceSignalPower−higher layer filtered RSRP. h(n) is a variable depending on a PUCCH format, $n_{CQI}$ is the number of information bits for CQI, and $n_{HARQ}$ indicates the number of HARQ bits. A value $\Delta_{F\_PUCCH}(F)$ is a relative value with respect to a PUCCH format 1a, and is a value reported by a base station through higher layer signaling as a value corresponding to a PUCCH format #F. g(i) indicates a current PUCCH power control adjustment state of a subframe index i.

When a value $P_{O\_UE\_PUCCH}$ is changed in a higher layer, an equation g(0)=0 is satisfied. Otherwise, an equation g(0)=$\Delta P_{rampup}+\delta_{msg2}$ is satisfied. $\delta_{msg2}$ is a TPC command indicated in a random access response, and $\Delta P_{rampup}$ corresponds to a total power ramp-up from first to last preambles provided by a higher layer.

When a terminal reaches transmission maximum power $P_{CMAX,c}(i)$ in a primary cell, a positive TPC command is not accumulated for the primary cell. On the other hand, when a terminal reaches minimum power, a negative TPC command is not accumulated. A terminal resets accumulation when a value $P_{O\_UE\_PUCCH}$ is changed by a higher layer, or a random access response message is received.

Meanwhile, Tables 5 and 6 below show values of $\delta_{PUCCH}$ indicated by a TPC command field in DCI formats. In particular, Table 5 shows values of $\delta_{PUCCH}$ indicated by DCI formats other than DCI format 3A, and Table 6 shows values of $\delta_{PUCCH}$ indicated by DCI format 3A.

TABLE 5

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 6

| TPC Command Field in DCI format 3A | $\delta_{PUCCH}$ [dB] |
|---|---|
| 0 | −1 |
| 1 | 1 |

Equation 4 below is an equation related to control of power of an SRS in the LTE system.

$$P_{SRS,c}(i) = \min \begin{cases} P_{CMAX,c}(i) \\ P_{SRS\_OFFSET,c}(m) + 10\log_{10}(M_{SRS,c}) + P_{O\_PUSCH,c}(j) + \alpha_c(j) \cdot PL_c + f_c(i) \end{cases} [dBm] \qquad [\text{Equation 4}]$$

In Equation 4, i denotes a subframe index and c denotes a cell index. Here, $P_{CMAX,c}(i)$ indicates maximum power that may be transmitted by a terminal, and $P_{SRS\_OFFSET,c}(m)$ indicates a value set to a higher layer, corresponds to a case of transmitting a periodic SRS when m is 0, and corresponds to a case of transmitting an aperiodic SRS when in is 0. $M_{SRS,c}$ denotes an SRS bandwidth in a subframe index i of a serving cell c, and is expressed by the number of resource blocks.

$f_c(i)$ denotes a value indicating a current PUSCH power control adjustment state for a subframe index i of a serving cell c, and $P_{O\_PUSCH,c}(j)$ and $\alpha_c(j)$ are as described in Equations 1 and 2.

However, the above-described conventional uplink power scheme does not sufficiently consider cooperative communication between base stations, that is, the wireless communication system employing the CoMP scheme. For example, according to the conventional uplink power control scheme, each terminal only considers signal attenuation from a base station (for example, an S-eNB) of a cell including the terminal in OLPC, and assumes that a control signal is received from a base station of a cell including the terminal in CLPC. Therefore, it is inefficient to apply the conventional uplink power control scheme without change to an environment in which an uplink signal is received and decoded through cooperation among several base stations.

As a similar case, for example, a PUCCH scheduled by a PDCCH received from eNB#1 may reduce uplink power, and may be transmitted to eNB#2 in terms of mitigating interference. Similarly, a PUSCH scheduled by a PDCCH received from eNB#1 may be transmitted to eNB#2 having a different cell identifier.

In particular, in a TDD system in which a downlink channel is estimated using an SRS due to symmetry between an uplink channel and a downlink channel, an SRS targeting a downlink transmission point may be different from an SRS targeting an uplink reception point. In this case, the SRS targeting a downlink transmission point and the SRS targeting an uplink reception point need to undergo different transmission power control operations. Hereinafter, details of this operation will be described with reference to drawings.

Figure 8:
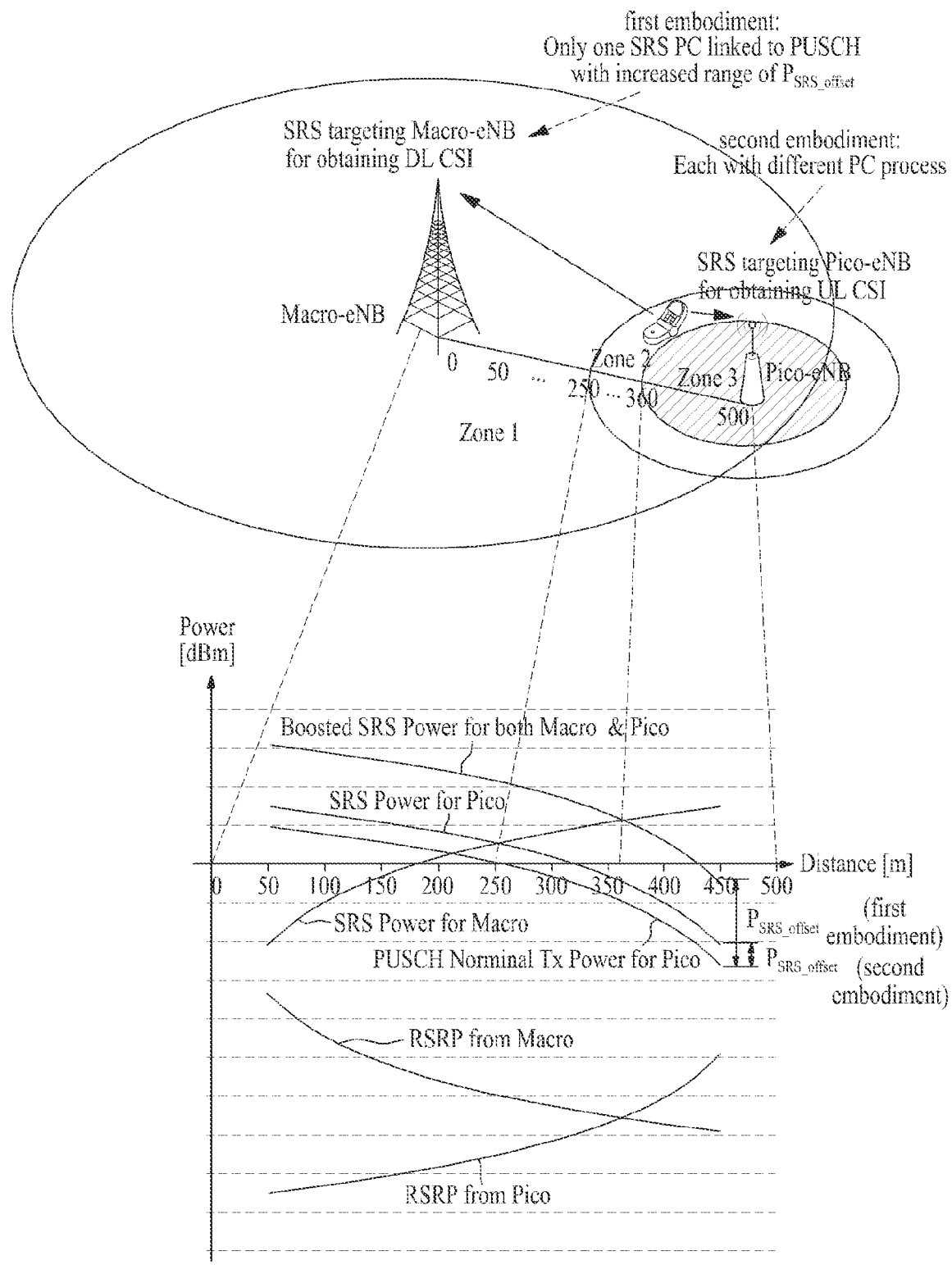
FIG. 8 is a diagram illustrating a case of transmitting a sounding reference signal (SRS) in a wireless communication system employing a Coordinated Multi-Point (CoMP) scheme.

FIG. 8 is a diagram illustrating a case of transmitting an SRS in a wireless communication system employing a CoMP scheme. In particular, FIG. 8 illustrates a circumstance in which a distance between a Macro-eNB and a Pico-eNB is 500 m, that is, a case in which a location of the Macro-eNB corresponds to a point 0 m, and a location of the Pico-eNB corresponds to a point 500 m.

First, a description will be given from the point of view of downlink. FIG. 8 depicts an "RSRP from Macro-eNB" curve for values obtained by measuring reference signal received power (RSRP) using a CRS (or a particular RS such as a CSI-RS and a TRS (tracking RS)) while a UE moves from a point of the Macro-eNB to a point of the Pico-eNB through a one-dimensional straight line, and depicts an "RSRP from Pico-eNB" curve for values obtained by measuring RSRP using a particular RS of the Pico-eNB.

In this instance, the two curves may intersect at a point, which approximately corresponds to a point 360 m in FIG. 8, and may correspond to an area indicating a downlink cell boundary between the Macro-eNB and the Pico-eNB. That is, it may be preferable that the Macro-eNB be used as a serving cell in an area between the points 0 m and 360 m and that the Pico-eNB be used as a serving cell in an area between the points 360 m and 500 m based on the point 360 m. To achieve this, a handover operation for changing a serving cell may preferably occur based on the point 360 m. The handover operation occurs at the point 360 m closer to the Pico-eNB since a transmission power value of the Pico-eNB is generally less than a transmission power value of the Macro-eNB. For example, the Macro-eNB may have a maximum transmission power value of 46 dBm, and the Pico-eNB may have a maximum transmission power value of 30 dBm.

However, from the point of view of an uplink, FIG. 8 depicts an "SRS power for Macro-eNB" curve indicating transmission power values at the time of controlling power to compensate for path loss between the UE and the Macro-eNB when the UE transmits an SRS (or another uplink signal such as a PUSCH and a PUCCH) to the Macro-eBN while moving from the point of the Macro-eNB to the point of the Pico-eNB through a one-dimensional straight line. In addition, FIG. 8 depicts an "SRS power for Pico-eNB" curve indicating transmission power values at the time of controlling power to compensate for path loss between the UE and the Pico-eNB when an SRS (or another uplink signal such as a PUSCH and a PUCCH) is transmitted to the Pico-eNB. In this case, the "SRS power for Macro-enB" curve and the "SRS power for Pico-eNB" curve may intersect at a center between the two eNBs approximately corresponding, to a point 250 m.

As described above, when a downlink cell boundary is different from an uplink cell boundary, a region between the two boundaries (Zone 2 between the points 250 m and 360 m in FIG. 8) may be referred to as a CoMP region. In the CoMP region, the UE may receive a downlink signal from the Macro-eNB, and transmit an uplink signal to the Pico-eNB. In particular, the TDD system in which downlink CSI is acquired using the symmetry between an uplink channel and a downlink channel may involve a case in which the UE transmits an SRS for acquiring downlink CSI to the Macro-eNB corresponding to a downlink transmission point, and transmits an SRS for acquiring uplink CSI to the Pico-eNB corresponding to an uplink reception point.

However, when a power control process is used as in a conventional technology, uplink transmission powers of the UE are forcibly indicated in a form of a "Boosted SRS power for both Macro-eNB and Pico-eNB" curve of FIG. 8 through CLPC using the parameter $f_c(i)$ irrespective of OLPC using path loss compensation performed only by an RS transmitted from the downlink transmission point. That is, a modulation and coding scheme (MCS) level for transmitting a PUSCH in the CoMP region may be properly selected only when an SRS is transmitted along the "Boosted SRS power for both Macro-eNB and Pico-eNB" curve having a constant power offset with respect to the "SRS power for Pico-eNB" curve.

The above-described operation may be restricted to be performed only for the CoMP region.

That is, in a region (Zone 1 of FIG. 8) close to the Macro-eNB where both a downlink transmission point and an uplink reception point are set to the Macro-eNB, power may be controlled through path loss compensation using an RS from the Macro-eNB as in a conventional power control operation. In a region (Zone 3 of FIG. 8) close to the Pico-eNB where both a downlink transmission point and an uplink reception point are set to the Pico-eNB, power may be controlled through path loss compensation using an RS from the Pico-eNB as in the conventional power control operation.

The CoMP region may be set to a region slightly wider than the region between the points 250 m and 360 m and including an extra region considering handover. In the above description, the CoMP region is expressed as a radius for convenience. However, the CoMP region may be expressed as a difference between values on the "RSRP from Macro-eNB" curve and the RSRP from Pico-eNB" curve.

First Embodiment

A first embodiment of the present invention suggests a scheme enabling an OLPC operation to be turned ON or OFF depending on a particular criterion as shown in Equation 5 below in light of uplink power of a UE forcibly controlled through CLPC using the parameter $f_c(i)$ irrespective of an OLPC value resulting from path loss compensation in the CoMP region.

$\alpha(j)=0$ and $P_{O\_PUSCH\_COMP}(j)$, when $0<RSRP^{(1)}-RSRP^{(2)}<$Threshold $\alpha(j)=1$ and $P_{O\_PUSCH}(j)$, otherwise [Equation 5]

Here, $\alpha(j)$ is a weighted parameter with respect to path loss compensation reflected in a power control equation in a form of $\alpha(j)$. PL, and j is a value obtained through higher layer signaling. In addition, $P_{O\_PUSCH,c}(j)$ is a parameter generated by a sum of a cell-specific nominal component $P_{O\_NOMINAL\_PUSCH,c}(j)$ provided from a higher layer and a terminal-specific component $P_{O\_UE\_PUSCH,c}(j)$ provided from the higher layer, and is a value that a base station reports to a terminal.

$RSRP^{(1)}$ may correspond to RSRP measured from a transmission point such as the "RSRP from Macro-eNB", and $RSRP^{(2)}$ may correspond to RSRP measured from another transmission, point such as the "RSRP from Pico-eNB". It is preferable that measured values of RSRP from a downlink transmission point and an uplink reception point in the CoMP region be defined as $RSRP^{(1)}$ and $RSRP^{(2)}$, respectively, and be calculated.

In addition, the Threshold value is a predefined value transmitted to a particular UE through higher layer signaling. For example, the Threshold value may be set to 9 dB, etc. That is, the criterion $0<RSRP^{(1)}-RSRP^{(2)}<$Threshold is merely an example of expressing the CoMP region. It is understood that various criteria capable of expressing the CoMP region (for example, the CoMP region may be expressed as a difference between path loss values, as a radius, etc.) are within the scope of the invention. In particular, when the CoMP region is expressed as a difference between path loss values, an RS transmission power value from a point needs to be reported in advance.

In addition, $P_{O\_PUSCH\_CoMP}(j)$ is a value to be used in the CoMP region and as a replacement for existing $P_{O\_PUSCH}(j)$, and may be provided in advance through terminal-specific higher layer signaling. That is, when $\alpha(j)=0$, etc. turns off open-loop path loss compensation, and another suitable $P_{O\_PUSCH\_CoMP}(j)$ is calculated by a network in advance, and is reported to a UE through terminal-specific higher layer signaling in the CoMP region, $P_{O\_PUSCH\_CoMP}(j)$ may be used instead of existing $P_{O\_PUSCH\_CoMP}(j)$ in the CoMP region. As another scheme, instead of defining additional terminal-specific higher layer signaling of $P_{O\_PUSCH\_COMP}(j)$, a UE may determine $P_{O\_PUSCH\_CoMP}(j)$ based on Equation 6 below at a point in time when the UE enters the CoMP region (for example, at a point in time when a criterion such as $0<RSRP^{(1)}-RSRP^{(2)}<$Threshold is satisfied).

$$P_{O\_PUSCH\_CoMP}(j)=\alpha(j)\cdot PL+P_{O\_PUSCH}(j) \quad \text{[Equation 6]}$$

Referring to Equation 6, PL indicates a current path loss value for a Macro-eNB. That is, when a calculated value $\alpha(j)\cdot PL$ is currently present at a point in time when a UE enters the CoMP region, and $P_{O\_PUSCH\_CoMP}(j)$ is set to a value obtained by adding existing $P_{O\_PUSCH}(j)$ to the value, a rapid change of power occurring when turning off an open-loop path loss compensation operation using $\alpha(j)=0$ in the CoMP region may be prevented.

In addition, $\alpha(i)=0$ used in the CoMP region is merely an example. An operation in the region is interpreted as an operation ignoring an open loop power control value resulting from path loss compensation, or an operation having another form different from an existing operation. Moreover, $\alpha(j)=1$ used in another region is merely an example, which corresponds to a case of using a higher-layer signaled value as a value $\alpha(j)$ without change.

Meanwhile, another example of the operation ignoring an open loop power control value resulting from path loss compensation, or the operation having another form in the CoMP region is as shown in Equation 7.

$$\alpha(j)=\min\{R\cdot|RSRP^{(1)}-RSRP^{(2)}-\text{Threshold}|,\alpha_{const}\}$$

Here, a constant value R is a parameter preset to a predetermined positive constant value determining a range of variation of a value $|RSRP^{(1)}-RSRP^{(2)}-\text{Threshold}|$, and transmitted to a UE through terminal-specific higher layer signaling. In addition, $\alpha_{const}$ refers to a value $\alpha(j)$ used in a region other than the CoMP region, and corresponds to 1 in the above embodiment. That is, $\alpha_{const}$ is a predetermined value from among 0, 0.4, 0.5, 0.6, 0.7, 0.8, 0.9, and 1.

Referring to the operation, in a region distant from the CoMP region (for example, a region in which both a downlink transmission point and an uplink reception point are set to the Macro-eNB, or a region in which both a downlink transmission point and an uplink reception point are set to the Pico-eNB), when a UE is close to a particular point, a value $R \cdot |RSRP^{(1)} - RSRP^{(2)} - Threshold|$ is greater than $\alpha_{const}$ and thus, $\alpha(j)$ is fixed to $\alpha_{const}$. As described above, in the region on the outside of the CoMP region provided as an example, a network calculates appropriate values of R and Threshold in advance so that $\alpha(j)$ is fixed to $\alpha_{const}$, and signals the values to the UE.

When a UE is present in the CoMP region $\alpha(j)$ may correspond to $R \cdot |RSRP^{(1)} - RSRP^{(2)} - Threshold|$. At both boundaries of the CoMP region (for example, the points 250 m and 360 m of FIG. 8), $R \cdot |RSRP^{(1)} - RSRP^{(2)} - Threshold|$ preferably corresponds to $\alpha_{const}$. $R \cdot |RSRP^{(1)} - RSRP^{(2)} - Threshold|$ may be set to a value less than $\alpha_{const}$ and decreasing as a UE moves inward in the CoMP region and corresponding to a minimum value at a halfway point of the CoMP region. This is effective in implementing an operation of smoothly attenuating the open-loop path loss compensation operation instead of turning off the open-loop path loss compensation operation in the CoMP region. That is, this is effective in smoothly performing a closed-loop power control operation using the parameter $f_c(i)$.

The first embodiment of the present invention presumes that $RSRP^{(1)}$ is RSRP for measuring an RS from a serving cell, and identification information of a cell (or an eNB or a transmission point) corresponding to a target of $RSRP^{(2)}$ measurement, a transmission power value (for example, an RS transmission power value) of the corresponding cell, etc. are reported to a UE through higher layer signaling in advance. The cell corresponding to a target of $RSRP^{(2)}$ measurement preferably corresponds to a particular Pico-eNB as in the above examples, and a cell identifier thereof or an RS transmission power value thereof is reported in advance, thereby performing the operation to apply the above equation using an RSRP value for a Pico-eNB having highest RSRP among Pico-eNBs as $RSRP^{(2)}$. When the RS transmission power value is reported in advance, a conditional expression may represent the CoMP region using path loss values in forms of $PL^{(1)}$ and $PL^{(2)}$ instead of $RSRP^{(1)}$ and $RSRP^{(2)}$.

The first embodiment is summarized below.

When a UE dynamically applies open-loop path loss compensation (for example, $\alpha(j)=0$ and $P_{O\_PUSCH\_CoMP}(j)$) in the CoMP region, and open-loop path loss compensation (for example, $\alpha(j) \in \{0, 0.4, 0.5, 0.6, 0.7, 0.8, 0.9, 1\}$) in other regions, it is possible to smoothly perform closed-loop power control using the parameter $f_c(i)$ at an eNB.

When an operation of smoothly attenuating open-loop path loss compensation from both boundaries toward the inside of the CoMP region is implemented using an unified particular function such as the above form $\alpha(j)=\min\{R \cdot |RSRP^{(1)} -$ $RSRP^{(2)} - Threshold|, \alpha_{const}\}$, it is possible to smoothly perform closed-loop power control using the parameter $f_c(i)$ at an eNB.

Second Embodiment

A second embodiment of the invention suggests using multiple concurrent power control processes in the CoMP region rather than using a single power control process as in the first embodiment. Here, the respective multiple concurrent power control processes use parameters completely independent of each other. For example, power control related parameters such as $P_{O\_PUSCH}(j)$, $\alpha(j) \cdot PL$, and $f(i)$ may be independently used. Further, the second embodiment suggests a scheme of continuously using, without initiation of a parameter, a particular power control process performing open-loop path loss compensation using an RS from a point when a handover to the point occurs while the multiple concurrent power control processes are used in the CoMP region. In this case, the other power control processes may be terminated, and not be used any longer. Details are described below.

A UE operating in a state in which both a downlink transmission point and an uplink reception point are set to a Macro-eNB (that is, a state in which a serving cell is set to a Macro-eNB) may operate according to a power control process such as Equation 8 below. Equation 8 below is identical to Equation 4 described above.

$$P_{SRS,c}^{(1)}(i) = \min\left\{ \begin{array}{l} P_{CMAX,c}^{(1)}(i) \\ P_{SRS\_OFFSET,c}^{(1)}(m) + 10\log_{10}(M_{SRS,c}^{(1)}) + P_{O\_PUSCH,c}^{(1)}(j) + \alpha_c^{(1)}(j) \cdot PL_c^{(1)} + f_c^{(1)}(i) \end{array} \right\} \quad \text{[Equation 8]}$$

In this instance, when the UE enters a CoMP region in which a downlink transmission point and an uplink reception point are different from each other (for example, an uplink reception point is set to a Pico-eNB while a downlink transmission point is the Macro-eNB, that is, a reception point is set to the Pico-eNB while a serving cell is the Macro-eNB), the power control process based on Equation 8 is maintained. That is, basic operations are maintained such that power control using accumulation is continuously performed without initialization of closed-loop power control using $f_c^{(1)}(i)$, and $\alpha_c^{(1)}(j) \cdot PL_c^{(1)}$ corresponding to open-loop path loss compensation is performed using an RS of the Macro-eNB.

At the same time, a separate SRS for an uplink reception point is transmitted by generating a new power control process as Equation 9 below. In this instance, all parameters such as $(P_{CMAX,c}^{(2)}(i))$, $P_{SRS\_OFFSET,c}^{(2)}(m)$, $P_{O\_PUSCH,c}^{(2)}(j)$, and $f_c^{(2)}(i)$ to be used in Equation 9 below may be newly transmitted to the UE through higher layer signaling.

$$P_{SRS,c}^{(2)}(i) = \min\left\{ \begin{array}{l} P_{CMAX,c}^{(2)}(i) \\ P_{SRS\_OFFSET,c}^{(2)}(m) + 10\log_{10}(M_{SRS,c}^{(2)}) + P_{O\_PUSCH,c}^{(2)}(j) + \alpha_c^{(2)}(j) \cdot PL_c^{(2)} + f_c^{(2)}(i) \end{array} \right\} \quad \text{[Equation 9]}$$

Referring to Equation 9, $\alpha_c^{(2)}(j) \cdot PL_c^{(2)}$ may indicate that path loss compensation is performed using an RS (for example, a CRS, a CSI-RS, and a TRS) from another reception point. $f_c^{(2)}(i)$ is accumulated in a closed loop scheme separately from $f_c^{(1)}(i)$.

The UE may separately transmit an SRS (for downlink CSI) power-controlled using $P_{SRS,c}^{(1)}(i)$, and an SRS (for uplink CSI) power-controlled using $P_{SRS,c}^{(2)}(i)$ in the CoMP region using separate time/frequency/space resources.

In addition, since SRS power for acquiring uplink CSI is determined based on $P_{SRS,c}^{(2)}(i)$ through the newly generated power control process in the CoMP region, a command for controlling $f_c^{(2)}(i)$ is preferably received using DCI (for example, DCI formats 0 and 4) for uplink scheduling thereafter. On the other hand, a TPC command corresponding to $P_{SRS,c}^{(1)}(i)$ which corresponds to an existing power control process, that is, a command for controlling $f_c^{(1)}(i)$ is not signaled using DCI for uplink scheduling any more and may be adjusted using DCI (for example, DCI formats 3 and 3A) for signaling a separate TCP command. On the contrary, the command for controlling $f_c^{(2)}(i)$ may be received using DCI formats 3 and 3A, and the command for controlling $f_c^{(1)}(i)$ may be received using DCI formats 0 and 4.

In addition, a power headroom for $P_{SRS,c}^{(2)}(i)$ may be reported when a PUSCH is transmitted based on $P_{SRS,c}^{(2)}(i)$ corresponding to the newly generated power control process, that is, when PUSCH transmission power is determined depending on a value obtained by excluding $P_{SRS\_OFFSET,c}^{(2)}(m)$ from $P_{SRS,c}^{(2)}(i)$. In this instance, a UE may report a power ratio of $P_{SRS,c}^{(1)}(i)$ to $P_{SRS,c}^{(2)}(i)$ or a difference in power between $P_{SRS,c}^{(1)}(i)$ and $P_{SRS,c}^{(2)}(i)$ together with power headroom of $P_{SRS,c}^{(2)}(i)$ so that power headroom corresponding to the separated existing power control process $P_{SRS,c}^{(1)}(i)$ may be simultaneously reported. Further, a point to which power headroom is transmitted is preferably reported by higher layer signaling.

In this instance, when the UE is handed over in a state in which both a downlink transmission point and an uplink reception point are set to the Pico-eNB (that is, a state in which a serving cell is changed to the Pico-eNB), the UE may operate to only transmit an SRS to the Pico-eNB while terminating the process of Equation 8, and continuously maintaining the power control process of Equation 9. Here, Equation 8 and Equation 9 correspond to the multiple power control processes.

Meanwhile, when the UE enters the COMP region, the newly generated power control process $P_{SRS,c}^{(2)}(i)$ may be maintained to perform path loss compensation using, an RS (for example, a CRS, a CSI-RS, a TRS, etc.) transmitted from a particular point used for open-loop path loss compensation in $P_{SRS,c}^{(1)}(i)$ as in a conventional scheme without change of a target to an RS from a point other than an existing point to perform open-loop path loss compensation. However, other parameters, that is, $(P_{CMAX,c}^{(2)}(i))$, $P_{SRS\_OFFSET,c}^{(2)}(m)$, $P_{O\_PUSCH,c}^{(2)}(j)$, $\alpha_c^{(2)}(j)$, and $f_c^{(2)}(i)$ are newly defined through higher layer signaling to enable a separate power control process to be performed. In this instance, RRC signaling may be received so that an eNB designates $\alpha_c^{(2)}(j)=0$, which may turn off an open-loop path loss compensation operation.

In addition, the power control process defined in the first embodiment may be used to calculate $P_{SRS,c}^{(2)}(i)$, thereby allowing separate transmission of an SRS for acquiring uplink CSI. In this case, a scheme of receiving the TPC command is as follows. In response to the UE entering the CoMP region, $f_c^{(1)}(i)$ is changed to be signaled using DCI formats 3 and 3A by receiving a particular tpc-Index and a particular TPC-PUSCH-RNTI through higher layer signaling, and $f_c^{(2)}(i)$ is signaled using DCI (for example, DCI formats 0 and 4) for uplink scheduling. The above-described scheme is characterized in that the power control process of $P_{SRS,c}^{(1)}(i)$ is not initialized and is continuously maintained when the UE enters the CoMP region.

Further, it is also possible to use a scheme of applying the multiple power control processes based on Equation 8 and Equation 9 to all regions instead of a scheme of operating both two power control processes based on Equation 8 and Equation 9 in the CoMP region, and activating only one of Equation 8 and Equation 9 in other regions. In this case, when a particular condition that may indicate the CoMP region such as $0 < RSRP^{(1)} - RSRP^{(2)} < Threshold$ described in the first embodiment is satisfied while the UE operates by activating both a power control process of an SRS targeting the Macro-eNB and a power control process of an SRS targeting the Pico-eNB at all times, the UE may operate to transmit two or more different SRSs based on predefined time/frequency/space resources. Otherwise, the UE may operate to transmit only an SRS related to a serving cell or the UE may transmit multiple SRSs based on particular time/frequency/space resources at all times according to multiple power control processes irrespective of a particular condition and a region.

The second embodiment is summarized as below.

First, the UE may be set by higher layer signaling to perform multiple power control processes. Referring to the multiple power control processes, the respective power control processes may use parameters completely independent of each other. For example, power control related parameters such as $P_{O\_PUSCH}(j)$, $\alpha(j) \cdot PL$, and $f(i)$ may be independently used. In addition, each of the power control processes may perform path loss compensation using a particular RS received from a reception point or a transmission point, and respective uplink transmissions may be performed according to one or more power control processes based on the multiple power control processes in the CoMP region.

Even when handover occurs outside the CoMP region, a particular power control process previously performing path loss compensation using a particular RS received from a particular hand-over point is not initialized and is continuously maintained. That is, the parameter f(i) may be continuously accumulated without being initialized.

The second embodiment of the present invention is described using SRS transmission as an example for convenience of description. However, the present invention is not limited to SRS transmission and may be applied to other uplink transmission such as transmission of a PUSCH, a PUCCH, etc. For example, when a particular power control process index is set to k, application of PUSCH power control may be extended as Equation 10 below.

$$P_{PUSCH,c}^{(k)}(i) = \min\left\{ \begin{array}{l} P_{CMAX,c}^{(k)}(i), \\ 10\log_{10}(M_{PUSCH,c}^{(k)}(i)) + P_{O\_PUSCH,c}^{(k)}(j) + \alpha_c^{(k)}(j) \cdot PL_c^{(k)} + \Delta_{TF,c}^{(k)}(i) + f_c^{(k)}(i) \end{array} \right\}$$ [Equation 10]

In addition, application of PUCCH power control may be extended as Equation 11 below.

$$P_{PUCCH}^{(k)}(i) = \min\begin{cases} P_{CMAX,c}^{(k)}(i), \\ P_{0\_PUCCH}^{(k)} + PL_c^{(k)} + h^{(k)}(n_{CQI}, n_{HARQ}, n_{SR}) + \Delta_{F\_PUCCH}^{(k)}(F) + \Delta_{T\times D}^{(k)}(F') + g^{(k)}(i) \end{cases}$$

[Equation 11]

In Equations 10 and 11, the PUSCH and the PUCCH indicate that multiple power control processes may be generated toward different points depending on the index k.

Third Embodiment

A third embodiment of the present invention suggests a scheme of determining PUSCH Tx transmission power based on a difference of an offset value by selectively linking PUSCH power control to an SRS power control process (through dynamic signaling or uplink signaling) for each of multiple power control processes for an SRS as a continuation of the second embodiment described above.

In the existing LTE system, PUSCH power control is defined ahead of the others, and SRS transmission power is determined to have a difference corresponding to a particular offset (for example, $P_{SRS\_OFFSET}$) value as in Equation 4. However, the third embodiment of the present invention suggests a scheme in which when multiple power control processors operate independently as in the second embodiment for SRS transmission power, and preferably, in which when some of the SRS power control processes operate based on a downlink transmission point for acquiring downlink CSI, and some of the SRS power control processes operate based on an uplink reception point for acquiring uplink CSI, power control of a PUSCH toward a particular point by being linked to one or some of the SRS power control processes is performed such that an SRS transmission power value determined by the corresponding SRS power control processes is determined to have a difference corresponding to a particular offset value.

The third embodiment of the present invention is described for each of Zone 1, Zone 2, and Zone 3 of FIG. 8.

(1) Zone 1

A UE operating in a state in which both a downlink transmission point and an uplink reception point are set to a Macro-eNB (that is, a serving cell is set to the Macro-eNB) may operate according to a power control process of Equation 12 below as in an existing scheme.

$$P_{SRS,c}^{(1)}(i) = \min\{P_{CMAX,c}^{(1)}(i), 10\log_{10}(M_{SRS,c}^{(1)}) + P_{O\_SRS,c}^{(1)}(j) + \alpha_c^{(1)}(j) \cdot PL_c^{(1)} + f_c^{(1)}(i)\}$$

[Equation 12]

As described above, i denotes a subframe index, and c denotes a cell index.

Referring to Equation 12, since both a downlink transmission point and an uplink reception point are set to the Macro-eNB, a value $f_c^{(1)}(i)$ corresponding to a TPC command may be adjusted using DCI (for example, DCI formats 0 and 4) for uplink scheduling.

In Equation 12, $P_{O\_SRS,c}^{(1)}(j)$ may be defined as a parameter generated by adding a cell-specific nominal component for SRS transmission to a terminal-specific component provided from a higher layer.

A UE for which power control of a PUSCH is determined by reflecting an offset value in SRS power according to the third embodiment of the present invention may be operated such that a TPC command having a size of 2 bits is used for a different purpose using DCI (for example, DCI formats 0 and 4) for uplink scheduling, and a TPC command for SRS power control adjusts $f_c^{(1)}(i)$ using separate DCI (for example, DCI formats 3 and 3A). Here, examples of the different purpose may include dynamically changing a cell identifier corresponding to a factor of an uplink DM-RS (for a dynamic uplink CoMP operation, etc.), and transmitting an SRS to a resource to which a DM-RS is transmitted (to expand SRS transmissible resources). Further, the examples may include indicating a process, among a plurality of SRS power control processes, linked to power control of a PUSCH (when a subcarrier aggregation scheme is applied).

(2) Zone 2

When a UE enters a CoMP region, a new power control process is generated according to Equation 13 below to transmit a separate SRS to an uplink reception point while continuously maintaining the power control process according to Equation 12 (that is, while continuously maintaining a basic operation of continuously accumulating closed-loop power control using $f_c^{(1)}(i)$ without initializing the control, and continuously performing $\alpha_c^{(1)}(j) \cdot PL_c^{(1)}$ corresponding to open-loop path loss compensation using an RS of the Macro-eNB).

$$P_{SRS,c}^{(2)}(i) = \min\{P_{CMAX,c}^{(2)}(i), 10\log_{10}(M_{SRS,c}^{(2)}) + P_{O\_SRS,c}^{(2)}(j) + \alpha_c^{(2)}(j) \cdot PL_c^{(2)} + f_c^{(2)}(i)\}$$

[Equation 13]

In this instance, in Equation 13, all parameters ($P_{CMAX,c}^{(2)}(i)$), $P_{SRS\_OFFSET,c}^{(2)}(m)$, $P_{O\_PUSCH,c}^{(2)}$, $\alpha_c^{(2)}(j)$, etc. may be newly transmitted to a UE through higher layer signaling. In particular, referring to Equation 13, $\alpha_c^{(2)}(j) \cdot PL_c^{(2)}$ indicates that path loss compensation is performed using an RS from another point, and $f_c^{(2)}(i)$ is accumulated in a closed loop scheme separately from $f_c^{(1)}(i)$. In addition, in Equation 12, $P_{O\_SRS,c}^{(2)}(j)$ may be defined as a parameter generated by adding a cell-specific nominal component for SRS transmission to a terminal-specific component provided from a higher layer.

That is, a UE may separately transmit an SRS (for downlink CSI) having power set to $P_{SRS,c}^{(1)}(i)$, and an SRS (for uplink CSI) having power set to $P_{SRS,c}^{(2)}(i)$ using separate time/frequency/space resources in the region. In addition, since transmission power of an SRS for acquiring uplink CSI is determined based on $P_{SRS,c}^{(2)}(i)$ in the CoMP region, a TPC command $f_c^{(2)}(i)$ corresponding thereto is preferably received using DCI (for example, DCI formats 0 and 4) for uplink scheduling thereafter. On the other hand, a TPC command corresponding to $P_{SRS,c}^{(1)}(i)$ which corresponds to an existing power control process, that is, a command for controlling $f_c^{(1)}(i)$ is not signaled using DCI for uplink scheduling any more, and may be adjusted using DCI (for example, DCI formats 3 and 3A) for signaling a separate TCP command. On the contrary, the command for controlling $f_c^{(2)}(i)$ may be received using DCI formats 3 and 3A, and the command for controlling $f_c^{(1)}(i)$ may be received using DCI formats 0 and 4.

A UE for which power control of a PUSCH is determined by reflecting an offset value in SRS power according to the third embodiment of the present invention may be operated such that a TPC command, having a size of 2 bits is used for a different purpose using DCI (for example, DCI formats 0 and 4) for uplink scheduling, and TCP commands for SRS power control for each of SRS power control processes corresponding to each of $P_{SRS,c}^{(1)}(i)$ and $P_{SRS,c}^{(2)}(i)$ adjust each of $f_c^{(1)}(i)$ and $f_c^{(2)}(i)$ using separate DCI (for example, DCI formats 3 and 3A). Here, examples of the different purpose may include dynamically changing a cell identifier corresponding to a factor of an uplink DM-RS (for a dynamic uplink COMP operation, etc.) and transmitting an SRS to a resource to which a DM-RS is transmitted (to expand SRS transmissible resources). Further, the examples may include indicating a process, among a plurality of SRS power control processes, linked to power control of a PUSCH.

(3) Zone 3

When a UE is handed over in a state in which both a downlink transmission point and an uplink reception point are set to a Pico-eNB (that is, a state in which a serving cell is changed to the Pico-eNB), the UE may operate to only transmit an SRS to the Pico-eNB while terminating the process of Equation 12 and continuously maintaining the power control process of Equation 13. Here, Equation 12 and Equation 13 correspond to the multiple power control processes.

In this instance, since both the downlink transmission point and the uplink reception point are set to the Pico-eNB, a value $f_c^{(2)}(i)$ corresponding to a TPC command may be adjusted using DCI (for example, DCI formats 0 and 4) for uplink scheduling.

A UE for which power control of a PUSCH is determined by reflecting an offset value in SRS power according to the third embodiment of the present invention may be operated such that a TPC command having a size of 2 bits is used for a different purpose using DCI (for example, DCI formats 0 and 4) for uplink scheduling, and a TPC command for SRS power control adjusts $f_c^{(2)}(i)$ using separate DCI (for example, DCI formats 3 and 3A). Here, examples of the different purpose may include dynamically changing a cell identifier corresponding to a factor of an uplink DM-RS (for a dynamic uplink CoMP operation, etc.), and transmitting an SRS to a resource to which a DM-RS is transmitted (to expand SRS transmissible resources). Further, the examples may include indicating a process, among a plurality of SRS power control processes, linked to power control of a PUSCH (when the subcarrier aggregation scheme is applied).

Furthermore, it is also possible to use a scheme of applying the multiple power control processes based on Equation 12 and Equation 13 to all regions instead of a scheme of operating two power control processes based on Equation 12 and Equation 13 in the CoMP region, and activating only one of Equation 12 and Equation 13 in other regions. In this case, when a particular condition that may indicate the CoMP region such as 0<RSRP$^{(1)}$–RSRP$^{(2)}$<Threshold described in the first embodiment is satisfied while the UE operates by activating both a power control process of an SRS targeting the Macro-eNB and a power control process of an SRS targeting the Pico-eNB at all times, the UE may operate to transmit two or more different SRSs based on predefined time/frequency/space resources. Otherwise, the UE may operate to transmit only an SRS related to a serving cell or the UE may transmit multiple SRSs based on particular time/frequency/space resources at all times according to multiple power control processes irrespective of a particular condition and a region.

When power control of a PUSCH is determined by reflecting an offset value in SRS power according to the third embodiment, and when a plurality of linkable SRS power control processes are present to determine power of the corresponding PUSCH, a process to be linked to needs to be dynamically indicated among the plurality of SRS power control processes. In this case, as described above, a TPC command included in the DCI (for example, DCI formats 0 and 4) for uplink scheduling may be used to indicate the SRS power control process. An additional field may be defined for the DCI (for example, DCI formats 0 and 4) for uplink scheduling, and include the information. In addition, a semi-static indication may be used through higher layer signaling.

Meanwhile, a PUSCH power control process linked to the SRS power control processes of Equation 12 and Equation 13 may be applied as Equation 14 below.

$$P_{PUSCH,c}(i) = \min \begin{cases} P_{CMAX,c}(i), \\ P_{PUSCH\_OFFSET,c}(m) + 10\log_{10}(M_{PUSCH,c}(i)) + P_{O\_SRS,c}^{(2)}(j) + \alpha_c^{(2)}(j) \cdot PL_c^{(2)} + \Delta_{TF,c}(i) + f_c^{(2)}(i) \end{cases}$$

[Equation 14]

Equation 14 indicates a case in which PUSCH power control is linked to the SRS power control process of $P_{SRS,c}^{(2)}(i)$.

In this instance, when a parameter $P_{PUSCH\_OFFSET,c}(m)$ is provided through higher layer signaling as Equation 14, a value having the opposite sign to that of an existing parameter $P_{SRS\_OFFSET,c}(m)$ is preferably used. Therefore, the parameter $P_{PUSCH\_OFFSET,c}(m)$ may be determined so that transmission power of a PUSCH may be set to power lower than a value $P_{SRS,c}^{(2)}(i)$ corresponding to SRS transmission power determined in advance.

Meanwhile, the third embodiment of the present invention suggests that a particular UE use a TPC command of a PUCCH included in DCI (for example, DCI formats 1A, 1, 1B, 1D, 2, 2A, 2B, and 2C) for downlink scheduling for the different purpose, and operate by applying an offset value to transmission power of the PUCCH by being linked to a particular SRS power control process among multiple power control processes for an SRS, preferably an SRS power control process for acquiring downlink CSI.

Furthermore, the second embodiment and the third embodiment of the present invention are not limited by the number of multiple power control processes, and two or more multiple power control processes may be set and operated.

Figure 9:
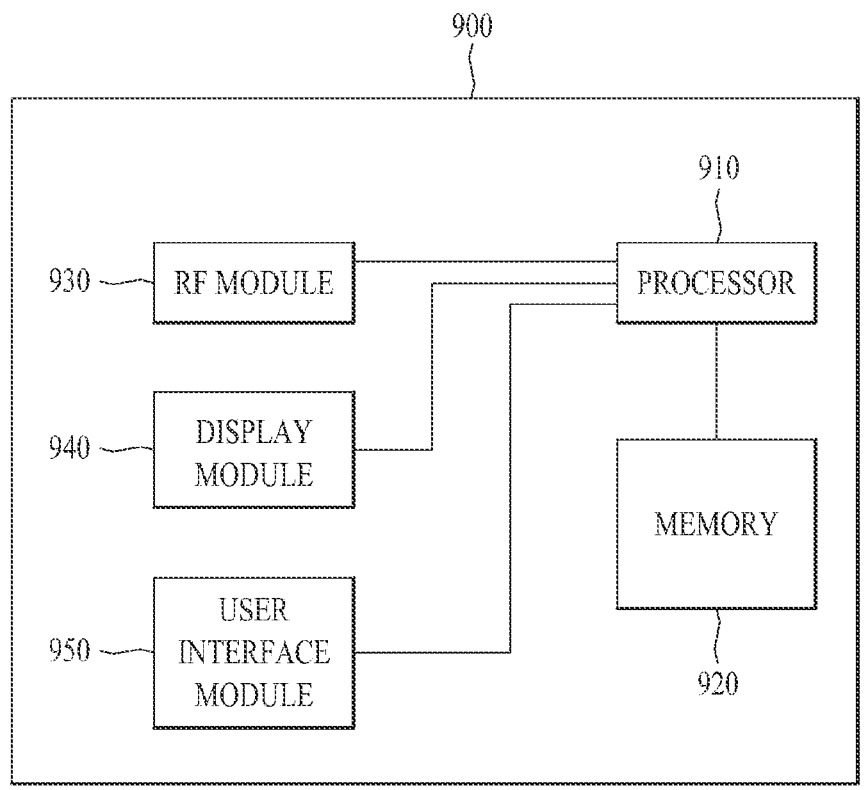
FIG. 9 is a block diagram of a communication device according to an embodiment of the present invention.

FIG. 9 is a block diagram of a communication device according to an embodiment of the present invention.

Referring to FIG. 9, the communication device, denoted by reference numeral 900, includes a processor 910, a memory 920, a radio frequency (RF) module 930, a display module 940, and a user interface module 950.

The communication device 900 is illustrated for convenience of description and some of modules thereof may be omitted. In addition, the communication device 900 may further include necessary modules. Moreover, some modules of the communication device 900 may be divided into segmented modules. The processor 910 is configured to perform the operations according to embodiments of the present invention illustrated with reference to the drawings. Specifically, descriptions of FIGS. 1 to 8 may be referred to for a detailed operation of the processor 910.

The memory 920 is connected with the processor 910 and stores an operating system, an application, program code, data, etc. therein. The RF module 930 is connected to the processor 910 and converts a baseband signal into a radio signal or vice versa. To achieve this, the RF module 930 performs analog conversion, amplification, filtering and frequency uplink conversion, or performs reverse processes thereof. The display module 940 is connected to the processor 910 and displays various types of information. Examples of the display module 940 include, but are not limited to, a liquid crystal display (LCD), a light emitting diode (LED), and an organic light emitting diode (OLED). The user interface module 950 is connected to the processor 910 and may be configured by a combination of well known user interfaces such as a keypad and a touch screen.

The aforementioned embodiments are achieved by a combination of structural elements and features of the present invention in a predetermined manner. Each of the structural elements or features should be considered selectively unless otherwise specified. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. It will be apparent that some claims not explicitly referring to one another may be combined to constitute an embodiment or to be included as a new claim by means of amendment after the application is filed.

The embodiments according to the present invention may be implemented by various means, for example, hardware, firmware, software, or a combination thereof. If an embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If an embodiment according to the present invention is implemented by firmware or software, the embodiment of the present invention may be implemented by a type of a module, a procedure, or a function, which performs functions or operations as described above. Software code may be stored in a memory unit and then driven by a processor. The memory unit may be located inside or outside the processor to transmit and receive data to and from the processor through various well-known means.

It will be apparent to those skilled in the art that the present invention may be embodied in other specific forms without departing from characteristics of the invention. Thus, the descriptions are to be considered in all respects as illustrative and not restrictive. The scope of the invention should be determined by reasonable interpretation of the appended claims and all change which comes within the equivalent scope of the invention are within the scope of the invention.

INDUSTRIAL APPLICABILITY

The method for controlling uplink transmission power in the above-mentioned wireless communication system and an apparatus therefor have been described based on an example in which the method and apparatus are applied to a 3rd generation partnership project long term evolution (3GPP LTE) system. However, the method and the apparatus are applicable to various wireless communication systems in addition to the 3GPP LTE system.

The invention claimed is:

1. A method for transmitting a sounding reference signal (SRS) in a base station cooperative communication system by a terminal, the method comprising:
    selecting at least one SRS power control process of a first SRS power control process and a second SRS power control process based on a region in which the terminal is located;
    determining transmission power of the SRS using the at least one SRS power control process; and
    transmitting the at least one SRS with the determined SRS transmission power to at least one of a first base station and a second base station participating in the base station cooperative communication,
    wherein the region in which the terminal is located comprises a base station cooperative region, for which a downlink reception target base station and an uplink transmission target base station are different from each other.

2. The method according to claim 1, wherein the region in which the terminal is located comprises:
    a first region including the downlink reception target base station and the uplink transmission target base station as the first base station; and
    a second region including the downlink reception target base station and the uplink transmission target base station as the second base station.

3. The method according to claim 2, wherein the at least one SRS power control process is the first SRS power control process when the terminal is located in the first region, is the second SRS power control process when the terminal is located in the second region, and includes both the first SRS power control process and the second SRS power control process when the terminal is located in the base station cooperative region.

4. The method according to claim 2, wherein when the terminal is located in the base station cooperative region, a path loss estimate $PL_c$ of the first SRS power control process is determined based on a reference signal received from the first base station, and a path loss estimate $PL_c$ the second SRS power control process is determined based on a reference signal received from the second base station.

5. The method according to claim 2, wherein a parameter of a corresponding SRS power control process is maintained when the terminal moves from the base station cooperative region to the first region or the second region.

6. The method according to claim 1, wherein the at least one SRS includes an SRS for downlink channel state information and an SRS for uplink channel state information when the terminal is located in the base station cooperative region.

7. The method according to claim 1, wherein an uplink data channel of the terminal is transmitted with transmission power obtained by reflecting an offset value in the determined SRS transmission power.

8. The method according to claim 1, wherein a power control process for an uplink data channel of the terminal is determined based on one of the first SRS power control process and the second SRS power control process, indicated by an uplink scheduling grant.

9. The method according to claim 1, wherein an uplink control channel of the terminal is transmitted with transmission power obtained by reflecting an offset value in the determined SRS transmission power.

10. A terminal device in a base station cooperative communication system, the terminal device comprising:
    a processor for selecting at least one SRS power control process of a first SRS power control process and a second SRS power control process based on a region in which the terminal device is located, and determining transmission power of an SRS using the at least one SRS power control process; and a wireless communication module for transmitting the at least one SRS with the determined SRS transmission power to at least one of a first base station and a second base station participating in the base station cooperative communication, wherein the region in which the terminal device is located device comprises a base station cooperative region, for which a downlink reception target base station and an uplink transmission target base station are different from each other.

\* \* \* \* \*